United States Patent [19]

Marsh et al.

[11] Patent Number: 5,684,250

[45] Date of Patent: Nov. 4, 1997

[54] SELF-CALIBRATING OPEN-CHANNEL FLOWMETER

[75] Inventors: Lawrence B. Marsh, Buckeystown; John D. Wright, Gaithersburg, both of Md.

[73] Assignee: Marsh-McBirney, Inc., Frederick, Md.

[21] Appl. No.: 517,214

[22] Filed: Aug. 21, 1995

[51] Int. Cl.⁶ .................................................. G01F 1/00
[52] U.S. Cl. ....................................... 73/227; 364/510
[58] Field of Search ............................. 73/215, 216, 227; 364/510

[56] References Cited

U.S. PATENT DOCUMENTS

| | | |
|---|---|---|
| 4,070,563 | 1/1978 | Petroff . |
| 4,083,246 | 4/1978 | Marsh ................................. 73/227 |
| 4,116,061 | 9/1978 | Petroff . |
| 4,211,111 | 7/1980 | Petroff . |
| 4,221,127 | 9/1980 | McClure ............................. 73/227 |
| 4,295,197 | 10/1981 | Petroff . |
| 4,344,329 | 8/1982 | Petroff . |
| 4,407,158 | 10/1983 | Petroff . |
| 4,754,641 | 7/1988 | Orban et al. . |
| 5,063,776 | 11/1991 | Zanker et al. . |
| 5,198,989 | 3/1993 | Petroff ................................ 73/227 |
| 5,315,880 | 5/1994 | Bailey . |
| 5,371,686 | 12/1994 | Nabity et al. . |
| 5,467,650 | 11/1995 | Cushing ............................. 73/227 |

*Primary Examiner*—Richard Chilcot
*Assistant Examiner*—R. Biegel
*Attorney, Agent, or Firm*—Laubscher & Laubscher

[57] ABSTRACT

An open-channel flowmeter is calibrated by the use of local velocity and level characteristics existing at a given site, as measured by the flowmeter itself. Stored reference relationships that have been either theoretically or experimentally derived are compared to the velocity level relationships at any particular site so as to determine a correction factor which is valid at that site so as to modify the sensed velocity to be an accurate approximation of the average velocity under those site conditions. A local velocity signal is modified so as to make it an accurate approximation of the mean velocity for open-channel flowmeters of the level/velocity type.

15 Claims, 9 Drawing Sheets

FIG. 1

| SENSOR LOCATION ☐ | | | |
|---|---|---|---|
| $\ell$ | $\overline{V}$ | $V_s$ | $k$ |
| 2 | 0.25 | 0.25 | 1.0 |
| 3 | 0.50 | 0.40 | 1.25 |
| 5 | 1.05 | 0.70 | 1.50 |
| 7 | 1.36 | 0.80 | 1.70 |
| 10 | 2.05 | 1.1 | 1.86 |

| SENSOR LOCATION | | X | |
|---|---|---|---|
| $\ell$ | $\overline{V}$ | $V_s$ | $k$ |
| 2 | 0.63 | 0.7 | 0.89 |
| 3 | 1.17 | 1.05 | 1.11 |
| 5 | 1.90 | 1.40 | 1.36 |
| 7 | 2.79 | 1.80 | 1.50 |
| 10 | 3.60 | 2.10 | 1.71 |

| $\ell$ | $\overline{V}$ | $V_S$ | $k$ |
|---|---|---|---|
| 2 | 1.20 | 1.30 | 0.92 |
| 3 | 1.80 | 1.75 | 1.04 |
| 5 | 2.80 | 2.40 | 1.17 |
| 7 | 3.93 | 2.90 | 1.35 |
| 10 | 5.1 | 3.40 | 1.50 |

SELF-CALIBRATING OPEN-CHANNEL FLOWMETER

SPECIFICATION

1. Statement of the Invention

The subject invention relates to a self-calibrating open-channel flowmeter including means for determining the flow coefficient for a particular site by examining the sensed velocity of the flowing fluid versus the level at one or more flow rates. The flow coefficient is then used to convert local velocity to average velocity over a wide range of fluid levels at that site.

2. Brief Description of the Prior Art

The need to monitor water and waste water over the last 20 years has increased significantly due to environmental laws and the cost of maintaining adequate water and waste water facilities. The measurement of open channel flow especially in sanitary and storm sewers is very difficult.

For electronic flowmeters that are placed in a standard section of sewer pipe, both the level and velocity must be measured accurately because both parameters vary as flow varies in such a piping system under open channel flow conditions. The slope and roughness of the pipe control the relationship between velocity and level. The slope (or grade) of the pipe chosen for a particular site is the result of civil engineering considerations determined by such factors as the terrain, whereas the roughness factor is the result of the surface of the pipe and obstructions such as bends and elbows.

Historically, flow in open channel piping has been measured through the use of the Manning equation or other empirical relationships where the pipe roughness and the slope of the water surface is used to yield a predictable relationship between the sensed level and flow through the pipe. Because it is very difficult to accurately measure either the roughness or the slope of the water surface directly, this technique has not been used where accurate flow measurements are required.

More recently the preferred method of measuring flow in open channel sewers has been the velocity/area technique. This technique utilizes the continuity equation which states that the flow Q is equal to the product of the mean (average) velocity V and the area A of the partially filled pipe, both of which are measured at a common cross-section.

Instruments using the velocity/area technique typically cannot directly measure the average velocity accurately enough for commercial use, and hence they typically contain a modifier that acts on the sensed velocity (local velocity) to better approximate the average velocity. This is true when the sensed velocities are localized to the bottom of the conduit, the sensed velocity is at the surface itself, on any other location that is not a direct measure of the mean velocity.

For any particular pipe size, the slope and roughness of the pipe establishes a velocity and level relationship under open channel flow conditions. As the slope of the pipe increases, the velocities tend to be higher for a given level and roughness, and as the roughness of the pipe increases the velocity tends to be lower for a given slope and level.

Thus, in general, however, the relationship between velocity and level are controlled by the slope and roughness of the pipe and the pipe diameter. Because it is very difficult to measure the actual average velocity directly, a variety of techniques have been developed where local velocity is measured (i.e., a sensed velocity that is related but not equal to the average velocity), and then the local velocity is modified so as to provide an accurate estimate of average velocity.

In the prior Marsh U.S. Pat. No. 4,083,246 (which is assigned to the same assignee as the present invention), a fluid flow measuring instrument is disclosed in which flow is determined by measuring both the level and the local velocity directly. The sensed local velocity is modified to approximate average velocity, and flow, F, is then calculated utilizing the continuity equation F=V×A, where V is the approximate average velocity of the flowing fluid and A is the partially filled area of the pipe.

In the aforementioned Marsh patent, the local velocity is measured near the bottom of the pipe. An appropriate modifier is determined by profiling the site with a portable velocity meter or by other means where the average velocity is determined at one or more flow rates, and subsequently through empirical equations contained in computer software the sensed velocity is transformed to an accurate approximation of the average velocity $\overline{V}$ over a wide range of levels (i.e. flow rates).

Others have proposed to measure velocities over a large portion of a cross-section of a flowing stream as an approximation of the true average velocity, together with the use of modifiers to improve the accuracy of the instrument. Refer for example, to the U.S. Pat. No. 5,371,686 to Nabity et al. In the Petroff U.S. Pat. No. 5,198,989, a velocity is measured that is the maximum observed in the cross-section, and in the Bailey U.S. Pat. No. 5,315,880, the velocity at the surface is measured. (See also Alan Petroff/ADS Technical Paper).

It has been discovered that if one analyzes the relationship between the local (sensed velocity) and the level for any particular pipe size and site location and compares these on-site relationships with those relationships obtained under controlled conditions, the modifiers necessary for converting the sensed or local velocity to average velocity can be predetermined without performing a separate or independent determination of the actual on site flow rate or average velocity.

It should be noted that a simple velocity and level relationship obtained under just one flow condition, while providing a reasonably accurate calibration coefficient, would not be as good as that obtained by looking at the relationship of velocity and level over a broader range of flow rates so as to better establish what true conditions exist due to the slope and roughness of that particular site. If, for instance, one looks at the velocity/level relationship over a period of time such as a week, the flow coefficient can be chosen based on the velocity/level relationship at a more narrow range of flow rates obtaining higher accuracy where most of the data is occurring for that particular site.

It is important to note that such a self-calibrating device or process is capable of reacting to various conditions that could result from downstream blockages or from tidal effects. Such conditions could cause the water level to rise and the velocity to slow down creating a different velocity/level relationship for that period of time where the unusual conditions exists. Separating these data sets obtained from this changed condition allows for different coefficients to be applied to each of the sets of different flow regimes.

SUMMARY OF THE INVENTION

Accordingly, a primary object of the present invention is to eliminate the necessity of independent site profiling, which often must take place at an inconvenient time, at inappropriate water levels or under difficult, confined space condition thereby making it possibly less accurate and less representative of the flow condition where most of the important date is concentrated.

A more specific object of the invention, is to provide an improved flowmeter in which any local velocity measurement—be it near the bottom, at the surface, or anywhere in between and utilizing different velocity sensing means—electromagnetic acoustic, microwave, optical or other is modified so as to cause it to better approximate the average or mean velocity. The modifying means utilizes velocity/level relationships for any particular velocity measuring techniques that have been gathered under controlled conditions and in comparison to local site characteristics provides information to determine what the multiplier factor relating the sensed velocity to the average velocity should be for a particular location (site). This multiplier factor (or flow coefficient) could either be a constant or vary with other parameters such as depth.

A further object of the invention is to provide a self-calibrating flowmeter having a default flow coefficient. The self-calibrating flowmeter may be installed with the default flow coefficient, and once exposed to flow, the measured level and velocity data obtained on site is compared to a library of data stored in the memory to arrive at an improved flow coefficient using data stored in a computer or archived in tabular form.

Other inputs needed to perform the self-calibration include the channel shape and channel dimensions. Direct knowledge of the conduit slope or roughness is not required.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
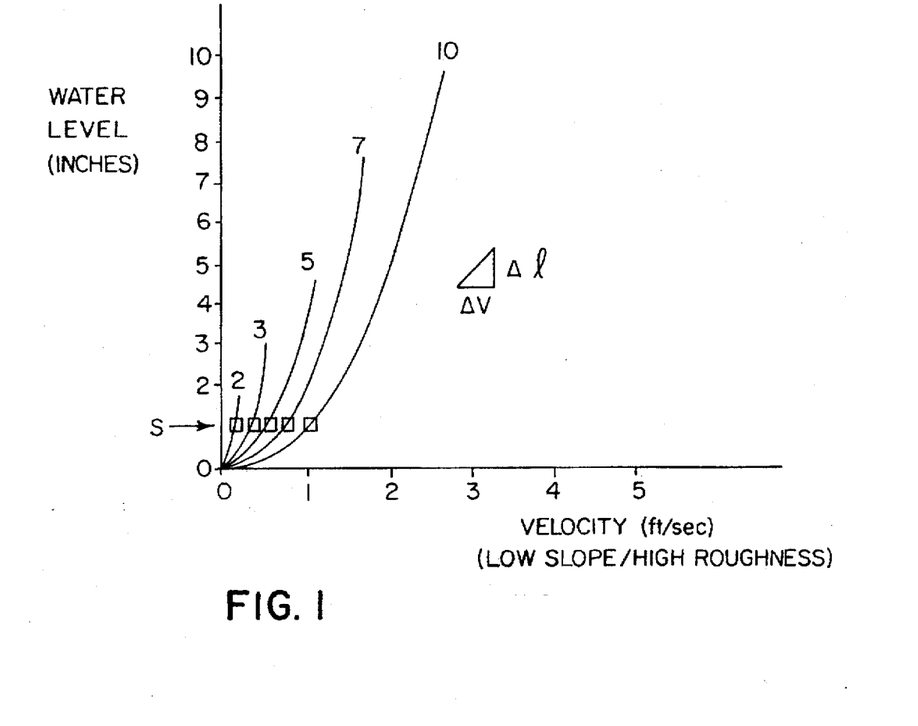
FIG. 1 is a graph of fluid level (or depth) plotted against flow velocity for a conduit having a low slope and a high degree of internal roughness.
Figure 2:
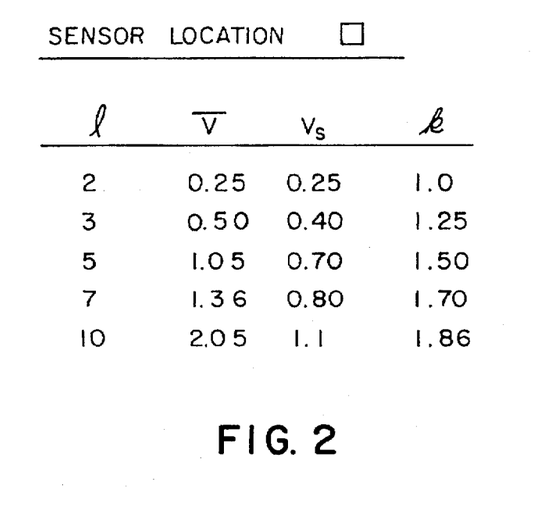
FIG. 2 is an accompanying table of graph values.
Figure 3:
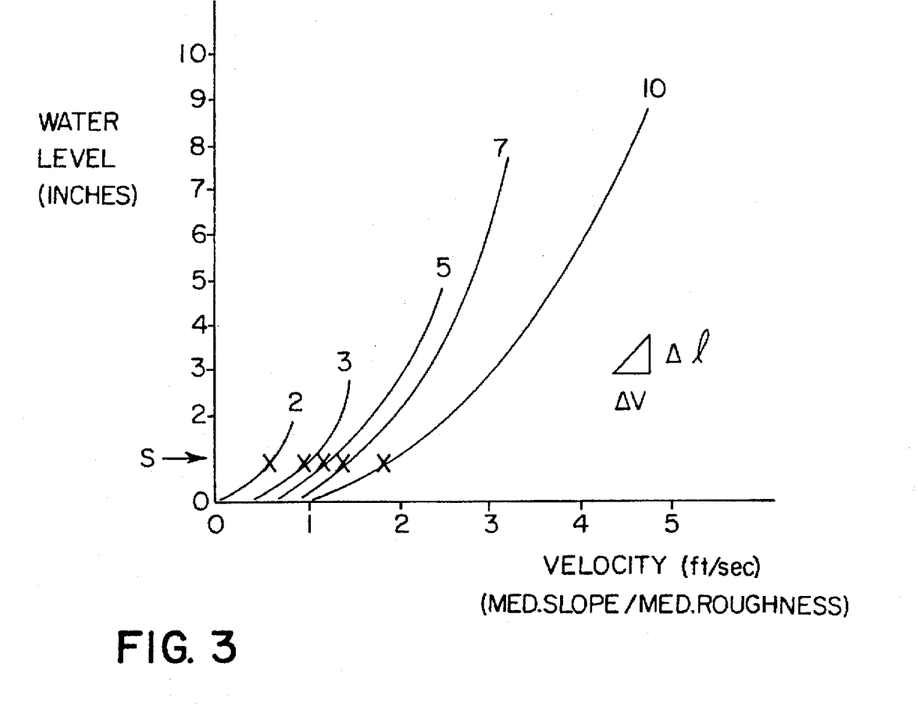
FIG. 3 is a graph of fluid level plotted against flow velocity for a conduit of medium slope and medium roughness.
Figure 4:
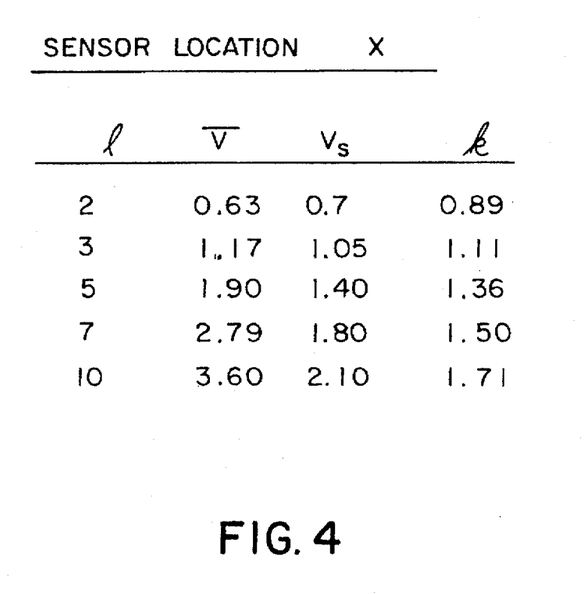
FIG. 4 is an accompanying table of values.
Figure 5:
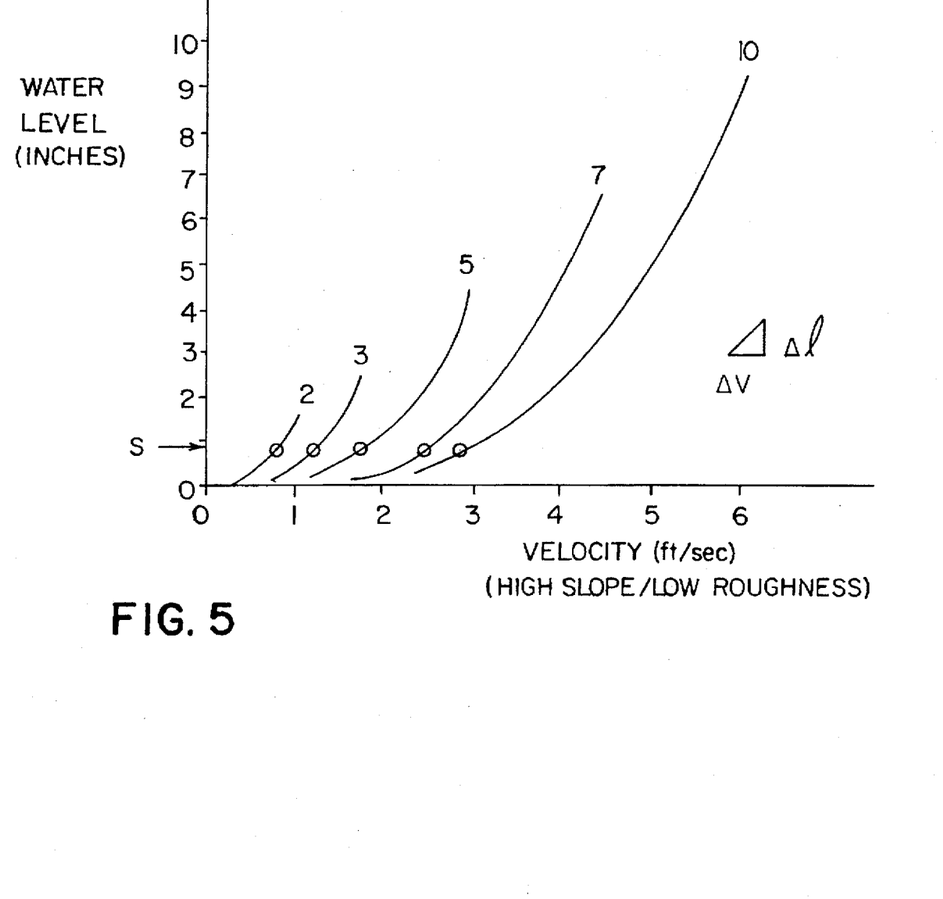
FIG. 5 is a graph of fluid level plotted against flow velocity for a conduit of high slope and low roughness.
Figure 6:
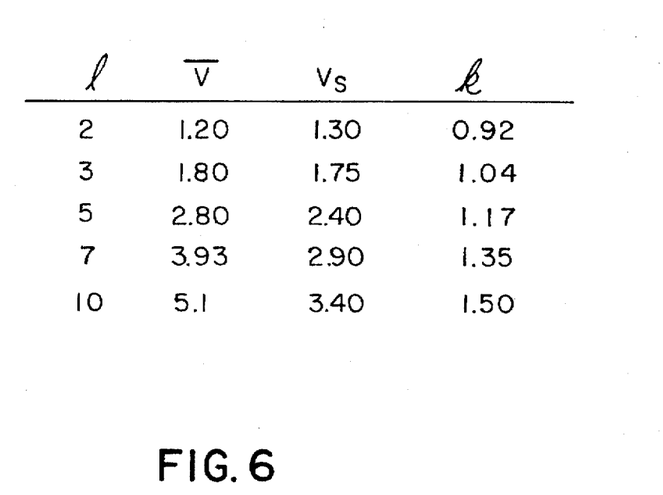
FIG. 6 is an accompanying table of values.

Referring first, more particularly, to FIGS. 1–6, flow in open channels will exhibit a pattern of velocities (a velocity profile) that is approximately logarithmic in shape. As flow increases, the liquid depth and the velocity at each point in the profile will increase, leading to a "family" of curves as shown in FIGS. 1, 3 and 5. For a given pipe characteristics (slope, roughness, etc.), as the flow (and depth) increase, the velocity profile is amplified exponentially, giving higher velocities at a given location in the flow. In FIG. 1, each curve represents a velocity profile that exists for different liquid depths. FIGS. 1, 3 and 5 illustrate how the family of profile curves varies with pipe characteristics. FIG. 1 represents a pipe with low slope/high roughness, FIG. 3 a pipe with moderate slope/moderate roughness, and FIG. 5 represents a pipe with high slope/low roughness.

As can be seen from FIGS. 1, 3 and 5, a low slope/high roughness pipe will exhibit lower velocities throughout the profile for a given depth of flow than a high slope/low roughness pipe will. For instance, at a flow depth of 10 inches, the velocity is only 2.5 ft/s at a position 7 inches above the channel bottom for the pipe characteristics represented in FIG. 1. But for the pipe represented in FIG. 3, under the same depth conditions, the velocity at 7 inches above the channel bottom is 6 ft/s because the pipe is steeper or smoother or both. Various combinations of pipe slope and roughness are found in most open channel piping systems.

Figure 7:
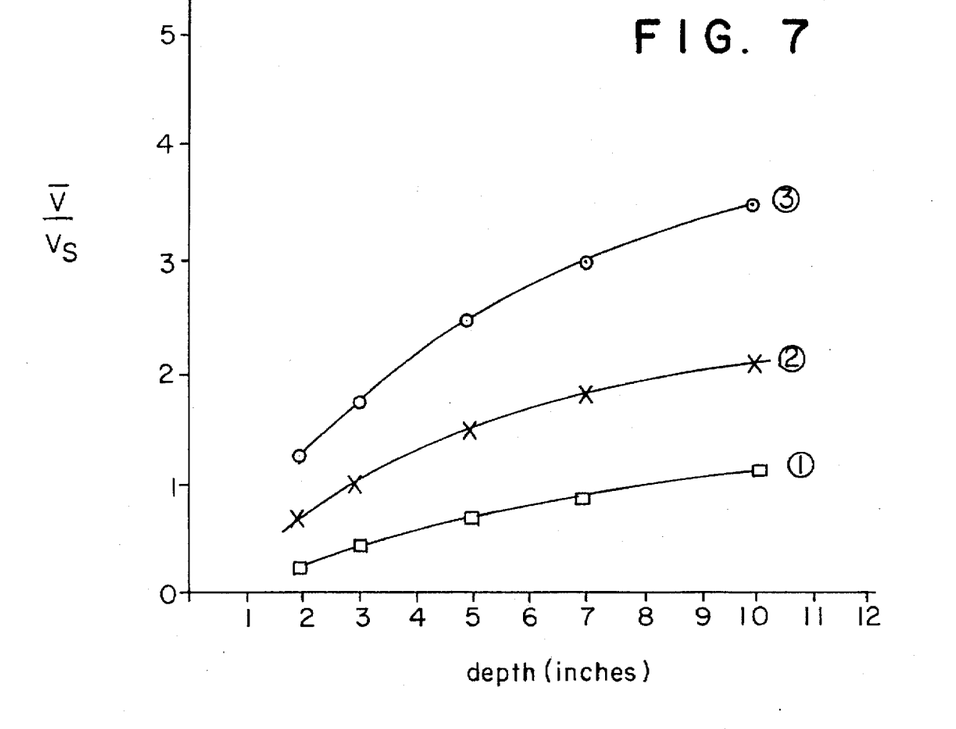
FIG. 7 is a graph illustrating the scatter plot of sensed velocity vs. level under the three flow conditions of FIGS. 1, 3 and 5.

Referring now to FIG. 7, the relationship between pipe characteristics and scatter plot characteristics of the conduit conditions of FIGS. 1, 3 and 5 are shown for corresponding electromagnetic velocity sensor locations one inch off the channel bottom, which corresponds to a typical location for an electromagnetic sensor positioned to measure a sensed local velocity in a sanitary sewer without collecting debris.

A plot of the sensed velocity versus the flow depth (a scatter plot) for the family of profile curves shown in FIGS. 1, 2 and 5 is shown in FIG. 7 depicting sensed velocity vs. depth.

FIG. 7 demonstrates that the characteristics of a scatter plot (such as slope and offset) are related to the characteristics of the pipe (pipe slope, roughness) where a level/velocity sensor is installed. The scatter plot for the profiles in FIG. 1 depicts a smaller change in velocity for an incremental change in level (ΔV/ΔL) than the scatter plot of the profiles of FIG. 5 which have a greater velocity change for the same incremental change in level. This behavior is directly related to the nature of the family of profile curves, which, in turn, is directly related to the characteristics of the pipe size/slope/roughness etc.). Other characteristics of the scatter plot provide additional (but less dramatic) insight into the site characteristics, the curvature of a best fit curve through the scatter plot being one such characteristic.

Figure 8:
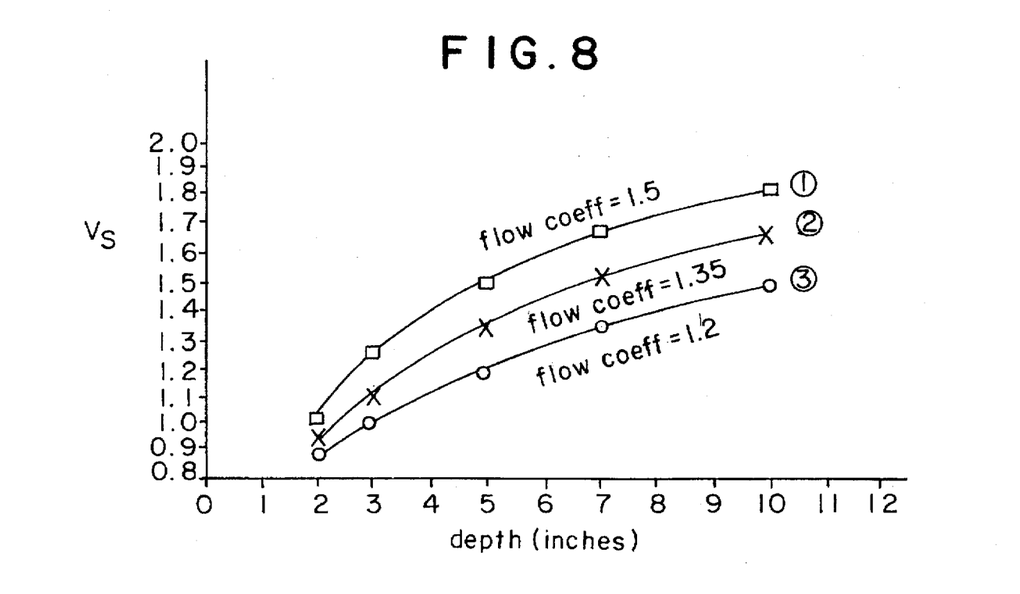
FIG. 8 illustrates three scatter plots of velocity/level curves representative of the flow coefficient required to convert the sensed velocity to average velocity.

Referring now to FIG. 8, the pipe characteristics that influence scatter plot shapes also influence which flow coefficient is required to convert the sensed velocity (as measured by a level/velocity meter) to the average velocity. More particularly, the velocity multipliers (average velocity divided by sensed velocity) for the profile curves given in FIGS. 1, 3 and 5 have been plotted versus the flow depth. Currently, use is made of a single "flow coefficient" to define a particular set of velocity multiplier values for various depths of flow.

For the examples given, the pipe represented in FIG. 1 requires a flow coefficient to 1.5, while the FIG. 3 profiles require a flow coefficient of 1.35, while the FIG. 5 profiles require a flow coefficient of 1.2. The reason for the difference in flow coefficient is that the slope/roughness differences in the pipe affect velocity profile shapes. By examining the velocity/level scatter plot characteristics the flow coefficient can be surmised at a particular site because it is directly related to the pipe slope/roughness as well.

Therefore, one can examine the characteristics of a scatter plot generated from a particular meter installation site and make a determination of what flow coefficient should be used to accurately site calibrate the meter.

Figure 9:
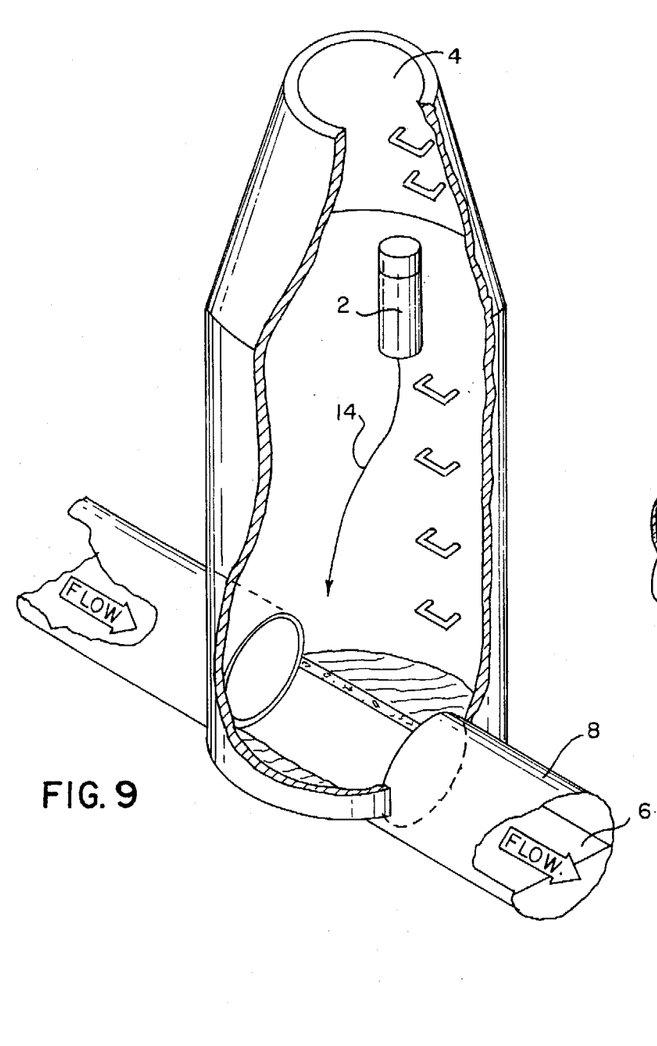
FIG. 9 is a diagrammatic illustration of a sewer system incorporating the flowmeter of the present invention.
Figure 10:
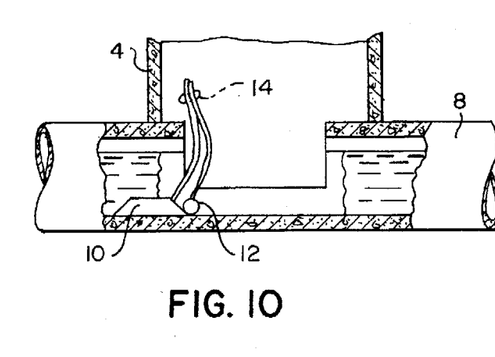
FIGS. 10–13 are diagrammatic illustrations of various flowmeter sensor arrangements according to the present invention.

Referring now to the flow measuring system of the present invention illustrated in FIG. 9, a portable flowmeter installation includes a flowmeter 2 installed inside a manhole 4 so as to measure the flow velocity of liquid 6 in a conduit 8. Manholes are normally installed where there is a change in direction, slope, or pipe size, or otherwise where there is a need to have access to the flow. FIGS. 10–13 illustrate various examples of different sensors for measuring the velocity of liquid flow in a conduit. Velocity sensors are generally of the electromagnetic, acoustic Doppler, microwave doppler, laser Doppler, correlation or scintillation type. Level transducers normally include bubbler type pressure transducers, submerged pressure transducers, submerged acoustic level transducers, and look-down acoustic, laser or microwave level transducers. FIG. 10 shows an electromagnetic velocity sensor 10 mounted on the bottom of conduit 1. Such bottom-mounted transducers are often secured in place by mounting bands (not shown). This electromagnetic velocity sensor also contains in the same housing a submerged pressure transducer 12. These combinations of velocity and level transducers are connected to the electronic processing contained in flowmeter 2 unit via cable means 14.

Figure 11:
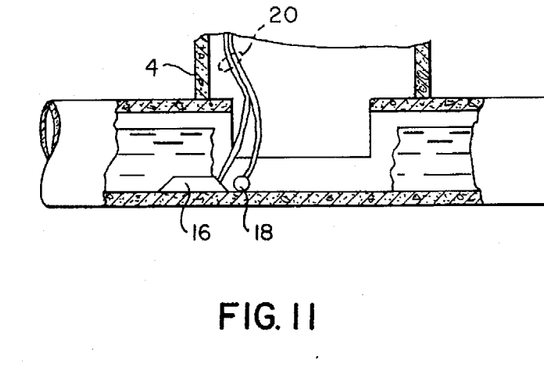

FIG. 11 illustrates a bottom-mounted Doppler velocity sensor 16 and a submerged pressure transducer 18. Again a cable 20 connects the sensors to the electronic processing unit.

Figure 12:
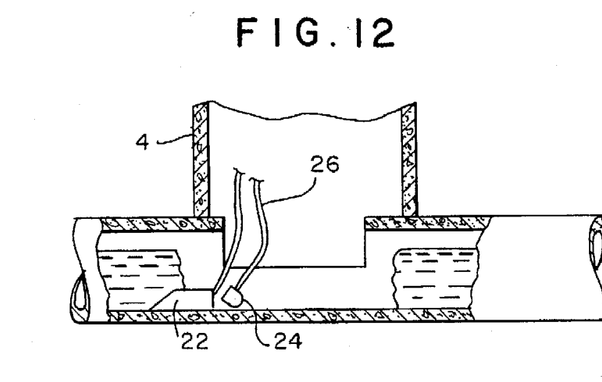

FIG. 12 shows a bottom-mounted Doppler surface velocity sensor 22 and a submerged pressure transducer 24. Again cable 26 connects the sensor to the flowmeter electronic processing means.

Figure 13:
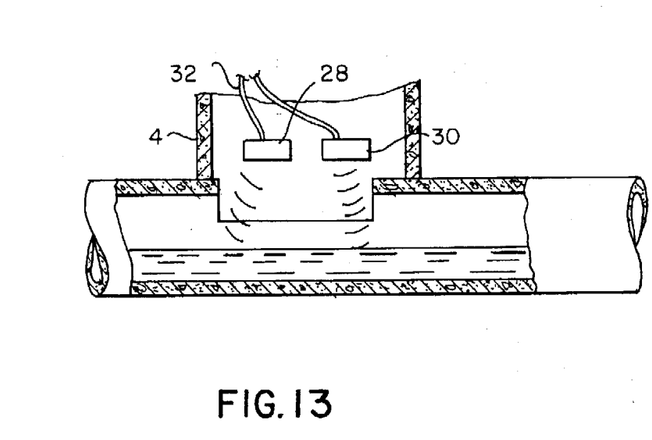

FIG. 13 illustrates a look-down velocity sensor 28 and a look-down depth sensor 13 connected by cable 32 to the electronic processing module.

Figures 14, 18:
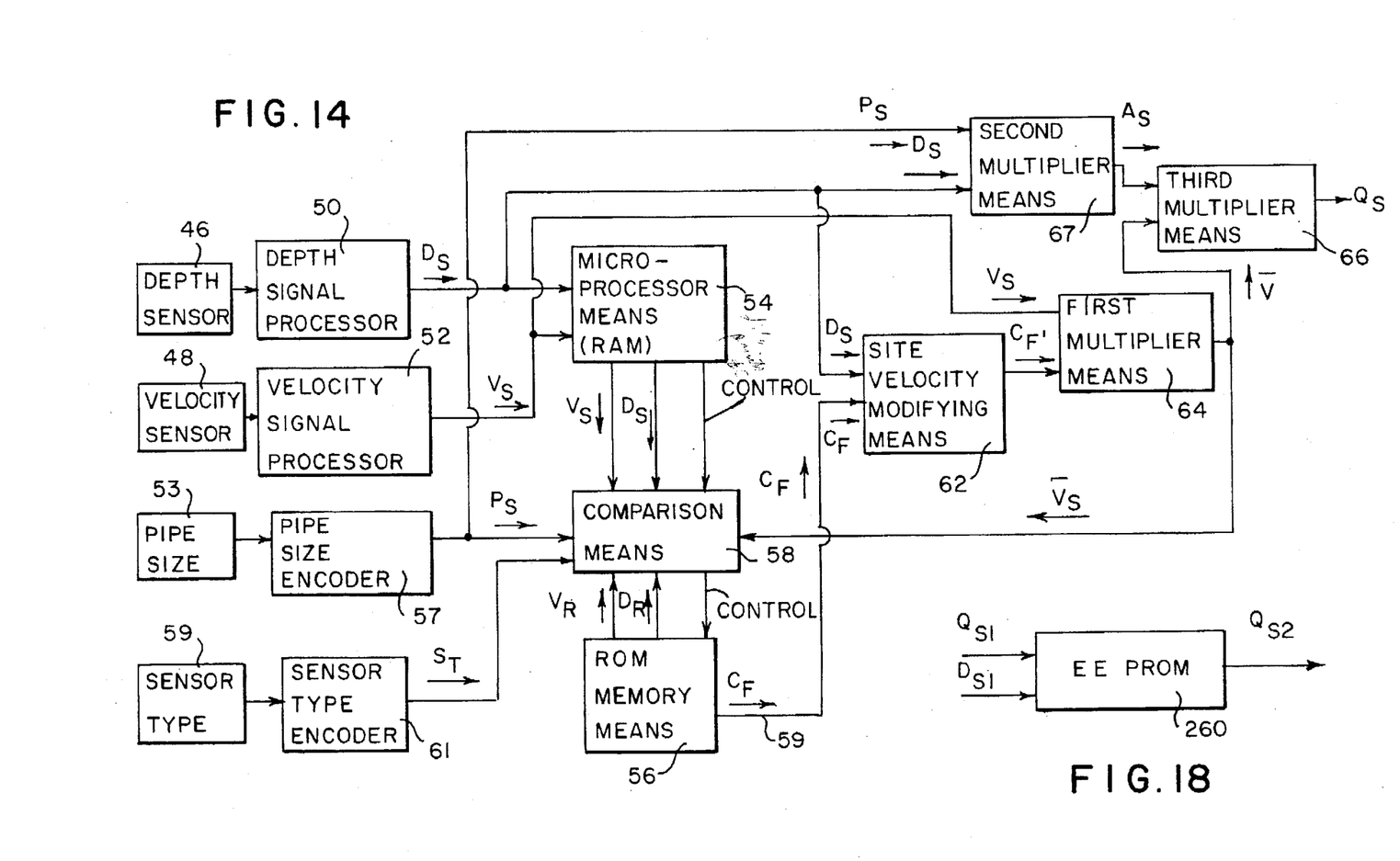
FIG. 14 is a block diagram of a preferred embodiment of the flowmeter of the present invention.
FIG. 18 is a block diagram of a level-only modification of the present invention.

Referring now to the block diagram of FIG. 14, the signal processing of the depth and velocity signals includes the improved processing means of the present invention. The outputs of depth sensor 46 and velocity sensor 48 are converted by signal processors 50 and 52 to the site depth signal Ds and the site velocity signal Vs, respectively. By use of the microprocessor 54 with RAM memory, corresponding depth and velocity signals are stored as pairs of data.

As will be described in greater detail below, contained in the more permanent read-only (ROM) memory means 56 are previously obtained pairs of velocity and level data that have been collected under controlled conditions in either a flow laboratory or in a carefully conducted field test. Data sets have been obtained for all pipe sizes expected to be seen by the device in the field under various slope and roughness combinations. Also contained in memory 56 are site flow coefficients that correspond to the level dependent multiplier and which serve to convert the sensed velocity to mean velocity once the particular flow condition at the field has been recognized.

The flow condition at the field is recognized by comparison means 58 which includes a microprocessor that compares data contained in RAM 54 (particularly the site velocity $V_S$ and the depth velocity $D_S$). The pipe size signal $P_S$ from manual source 53 is supplied to comparison means 58 via encoder 57. By observing the scatter plot that exists between site velocity and site depth for that particular pipe size, comparison means 58 searches in memory means 56 to find an equivalent velocity/level relationship for the particular pipe size and that particular velocity measuring device (i.e., bottom-mounted electromagnetic, bottom-mounted Doppler, surface-mounted velocity sensor, and the like). For each type of velocity measuring device there must be stored the reference velocity and levels and corresponding site calibration coefficient $C_F$. Once the corresponding curves have been matched, then the corresponding site calibration coefficient $C_F$ (which is generally depth dependent) is supplied to the site velocity modifying means 62 together with the depth signal $D_S$.

The site calibration coefficient $C_F$ and the depth signal $D_S$ are supplied to the site velocity modifying means 62, whereupon the depth-modified coefficient $C_F'$ is supplied to first multiplier means 64 together with the sensed velocity $V_S$, thereby to produce the average velocity signal V which is supplied as one input to third multiplier means 66. To the other input of the third multiplier means 66 is applied an area signal $A_S$ which is the product of pipe size signal $P_S$ produced by second multiplier means 67 from manually-set pipe size signal generator 53 and pipe size encoder 57, and the site depth signal $D_S$. The desired flow signal $Q_S$ is produced at the output of the third multiplier means 66.

Figure 15:
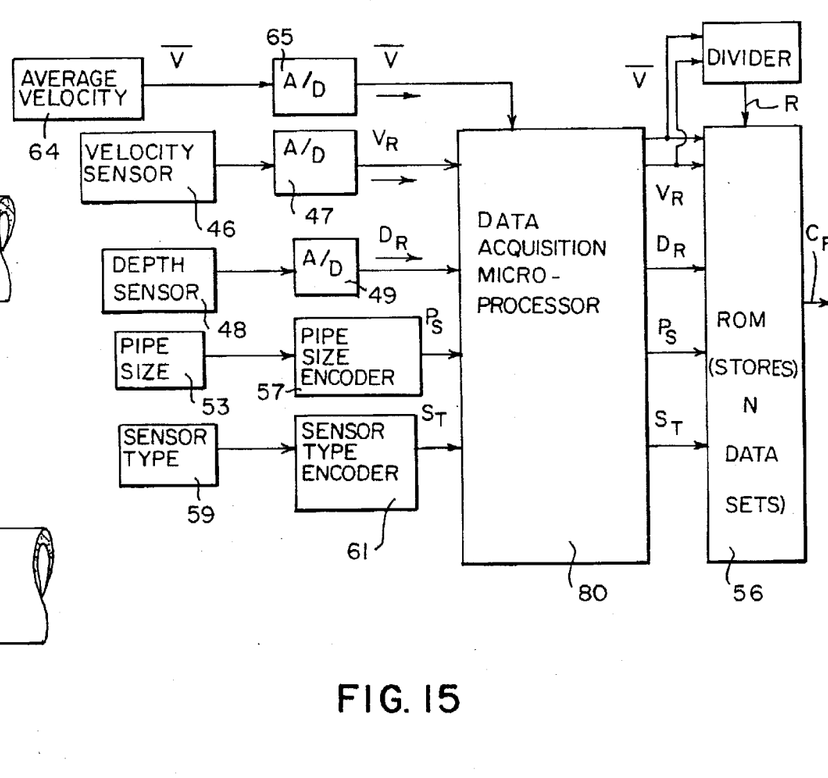
FIG. 15 is a block diagram of the means for obtaining and storing the reference data in the storage means of FIG. 14.

Referring now to FIG. 15, in order to obtain the reference data stored in ROM data memory means 56, through a combination of mathematical modeling and actual testing of velocity and level sensors, under a variety of flow conditions a means of collecting these various relationships is achieved. In particular, inputs to a data acquisition memory consist of five different inputs (i.e., the average velocity obtained from the reference standard, the sensor type, the sensed velocity, the sensed depth, and the pipe size corresponding to each of the previous inputs). For each input the data is run on each pipe size, or on a range of pipe sizes, and are recorded on a ROM. The reference depth and reference velocity and the ratio R of average velocity to reference velocity at each depth are recorded in the ROM along with the corresponding pipe size and sensor type by means of which the measurements were obtained. Of course, if only one sensor type is used, then the sensor type factor can be eliminated. Typically, not every condition is tested, but through mathematical modeling and interpolation a good estimation for the intermediate sizes can be achieved and the data either stored directly in ROM or, alternately an equation depicting the velocity and depth relationships stored.

Figure 16:
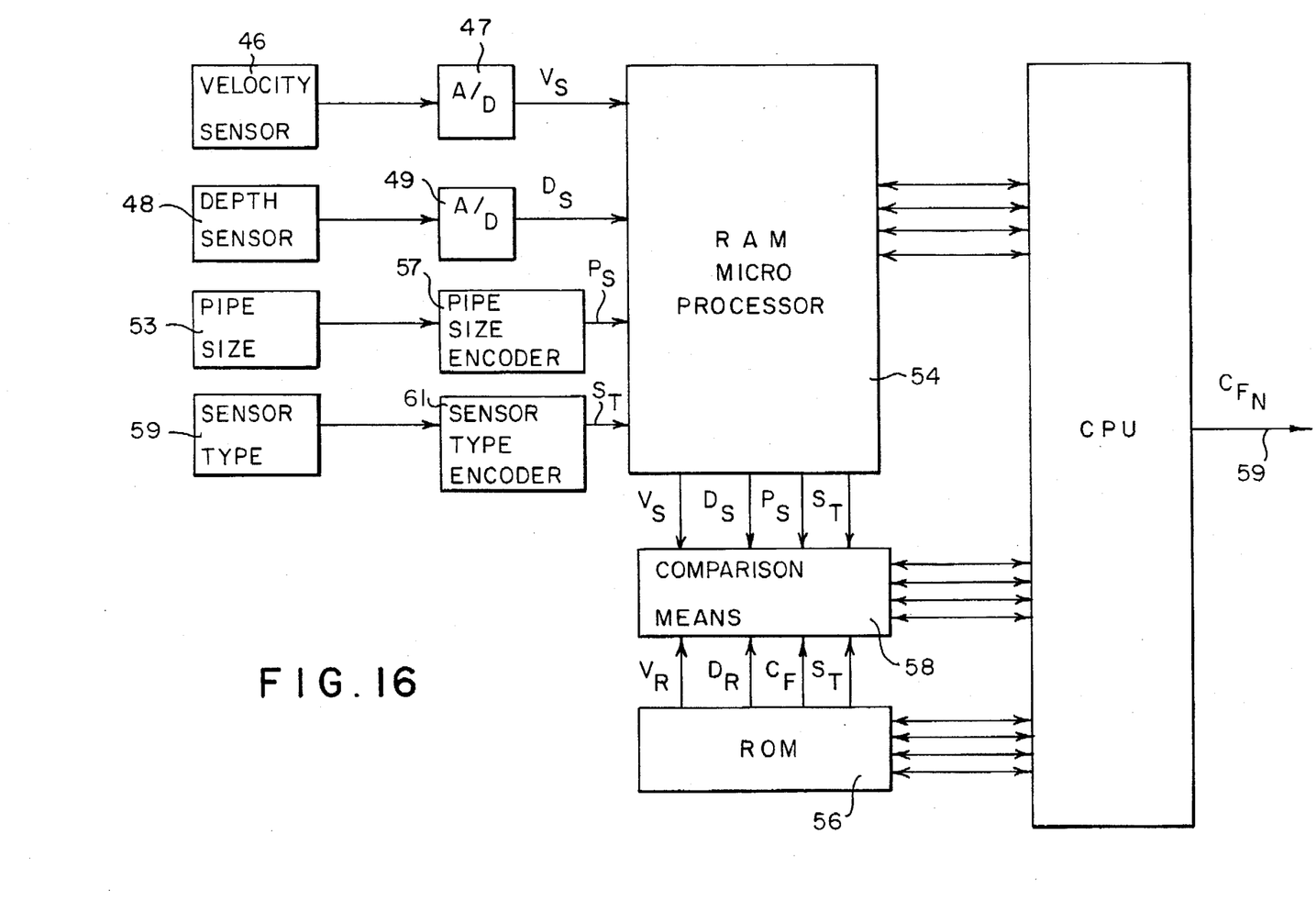
FIG. 16 is a block diagram of the means for processing the sensed signals in FIG. 14.

Referring now to FIG. 16, the processing of the site depth signal $D_S$ and the site velocity signal $V_S$ are processed together with pipe size signal $P_S$, and the sensor type signal produced by manually-set sensor type signal generator means 59 and sensor type encoder 61. These signals are processed by microprocessor 54 and a corresponding RAM (Randon Access Memory) and ROM. The local sensed velocity and depth signals are digitized and stored in RAM 54 along with information regarding the pipe size and the sensor type for that particular site. Inputted to the comparison means 58 is the sensed velocity, sensed depth pipe size conduit size and sensor type information. The comparison means searches the ROM 56 so as to find that stored data that is pertinent for this sensor type. The next step is that from the stored data for the sensor type the stored data corresponding to the site conduit size is located. From the stored information pertinent to both the pipe size and the sensor type, the $V_S$ and $D_S$ of the site is compared to the $V_R$ and $D_R$ in the appropriate memory section so as to find the best fit $V_R$ and $D_R$ that match the data pair $V_S$ and $D_S$. For each matching pair of data points, the corresponding flow coefficient $C_F$ is chosen and subsequently provided to the site velocity modifying means for multiplying by the sensed local velocity $V_S$.

Figure 17:
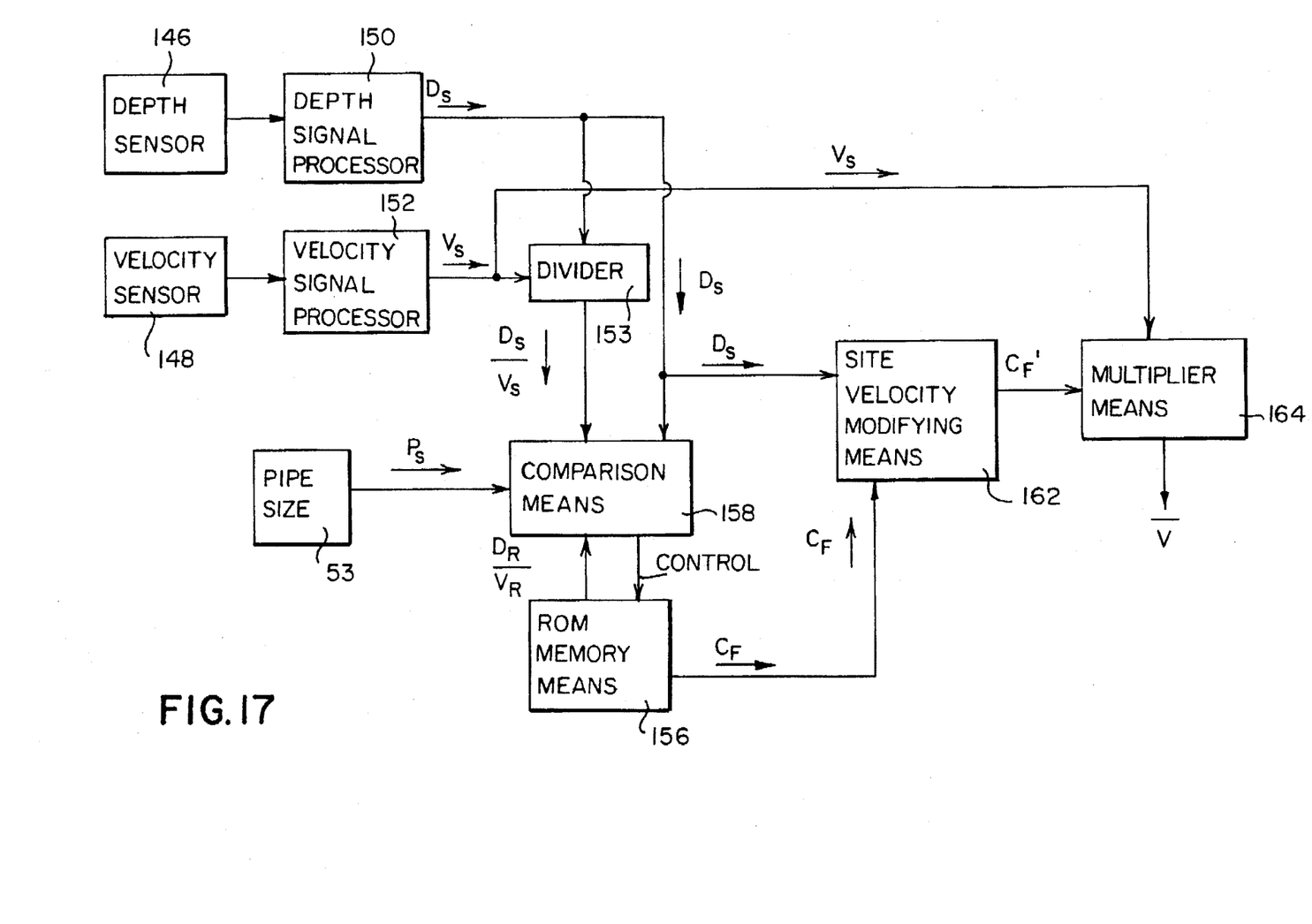
FIG. 17 is a block diagram of an alternate embodiment of the flowmeter system of FIG. 14.

The average velocity, the level and the subsequent flow rates can either be stored for later use, or be channeled to an indicator for instant read out. It is important to note that the set of stored relationships in memory 56, 156 can be a computer program that compares the velocity/level data that is recorded over some period of time, or just one velocity/level part itself so as to provide the correction factor. In any event, the stored general relationship of memory 56, 156, which have been theoretically or experimentally derived, are compared with the local velocity and depth relationship at any particular site so as to determine a correction factor which is tailored to that site so as to modify the sensed velocity to be an approximation of average velocity under those site conditions.

An alternate means of modifying the sensed velocity utilizing velocity/level relationships is indicated in FIG. 17. In this alternate embodiment the depth signal $D_S$ is divided by the site velocity signal $V_S$ via division module 153 producing at its output the ratio Ds/Vs. The level/velocity relationship represents the level/velocity at a particular flow condition. Comparison means 158 is a microprocessor that combines this ratio of depth to velocity $D_S/V_S$ and the depth $D_S$ and pipe size $P_S$ to search for an equivalent pair of reference ratios DR/VR. Once the set of reference ratios have been found in memory 156, the calibration coefficient $C_F$ for this particular site condition is processed similar to that of FIG. 14.

Because of expense, quite often users do not wish to install a velocity/level flowmeter at all sites. In particular a "level only" type flowmeter will work as long as the velocity and level relationship are stable and repeatable for a particular site. In such cases the user may use a weir or flume which have predictable level-to-flow rate relationships or alternatively, by performing extensive site profiling to determine the level-to-flow rate relationship of a standard piece of conduit under various flow conditions, and if such conditions are stable one can utilize this information to obtain flow from just a level reading itself. However, such site profiling at different levels (flow rates) is both time consuming and possibly dangerous due to confined space entry conditions. The present invention lends itself to provide a much easier and more accurate means of establishing the level to flow relationship in a standard conduit.

Referring now to FIG. 18, the flow rate $Q_{S1}$ at a particular site has been obtained by the instant invention and stored along with the depth $D_{S1}$ at the site for each flow rate.

In other words pairs of data points $Q_{S1}$ and $D_{S1}$ that were measured with the instant invention are stored in an electrical erasable prom EEPROM 260. The information in this EEPROM can either be copied electrically, or the EEPROM physically removed and installed in a second flowmeter. This second flowmeter does not have a velocity sensor but only has a level or depth sensor. The depth sensor does not necessarily need to be of the same type as was used to collect the original depth and flow rate data. This depth signal $D_{S2}$ is analyzed by a microprocessor in this level-only flowmeter. For every depth signal $D_{S2}$, the memory means 260 is searched for an equivalent depth signal $D_{S1}$, and once this is found, the flow corresponding to $D_{S1}$ is read out of memory 260 and is outputted as $Q_{S2}$.

What is claimed is:

1. Fluid velocity measuring apparatus for indicating the average rate of fluid flow in an open-channel conduit, comprising:

(a) sensor means for producing local depth ($D_S$) and local velocity ($V_S$) signals at a given open-channel site;

(b) memory means (56) for storing a plurality of sets of reference depth ($D_R$) and reference velocity ($V_R$) signals corresponding to a plurality of flow coefficients ($C_F$) each of which is representative of the ratio between averaged to sensed velocity, respectively;

(c) comparison means (58) responsive to said local depth and local velocity signals and to said reference depth and reference velocity signals for selecting the corresponding flow coefficient ($C_F$), respectively; and (d) first multiplier means (64) for multiplying said local velocity signal and said flow coefficient, thereby to produce an average velocity signal (V).

2. Apparatus as defined in claim 1, wherein said flow coefficients correspond with different conduit sizes and cross-sectional configurations, respectively.

3. Apparatus as defined in claim 1, wherein said flow coefficients correspond with different velocity sensor types.

4. Apparatus as defined in claim 1, wherein said flow coefficient is depth-dependent; and further including modifying means (62) responsive to said site depth ($D_S$) for producing a distinctive corresponding flow coefficient ($C_F'$) that is supplied to a first multiplier means.

5. Apparatus as defined in claim 4, wherein said comparison means is responsive to the size and cross-sectional configuration of the conduit, and means (53,57) for supplying to said comparison means a conduit signal ($P_S$) that is a function of the conduit size and configuration.

6. Apparatus as defined in claim 5, and further including second multiplying means (67) responsive to said conduit signal and to said local depth signal for producing an area signal ($A_S$), and third multiplier means (66) responsive to said average velocity signal and to said area signal for producing an output flow signal ($Q_S$).

7. Apparatus as defined in claim 1, wherein said comparison means (158) is responsive to the ratio of said local depth and local velocity signals;

(e) and further including divider means (153) responsive to said local depth and local velocity signals for producing a signal ($D_S/V_S$) that is the ratio of said local depth and local velocity signals, said comparison means being responsive to the ratio of said local depth and local velocity signal to produce a distinctive flow coefficient.

8. Apparatus as defined in claim 1, wherein said sensor means comprises an electromagnetic sensor; and further wherein said memory means contains sets of depth and velocity reference signals representative of those produced under controlled conditions by electromagnetic sensor means.

9. Apparatus as defined in claim 1 wherein said sensor means comprises a submerged Doppler signal generator; and further wherein said memory means contains sets of depth and velocity reference signals representative of those produced under controlled conditions by submerged Doppler signal generator means.

10. Apparatus as defined in claim 1, wherein said sensor means is selected from the group consisting of submerged acoustic time-of-travel velocity sensing means, acoustic look-down velocity sensing means, microwave look-down velocity sensing means, and look-down optical sensing means; and further wherein said memory means contains sets of depth and velocity reference signals representative of those produced under controlled conditions by said velocity signal sources, respectively.

11. The method for measuring the flow rate of fluid flowing in an open-channel conduit, comprising:

(a) generating a plurality of sets of reference depth ($D_R$) and reference velocity ($V_R$) signals corresponding to a plurality of flow coefficients ($C_F$) each of which is representative of the ratio between average velocity to sensed velocity, respectively (b) storing said flow coefficients in a signal comparison means;

(c) supplying the sensed depth ($D_S$) and velocity ($V_S$) signals to said comparison means to produce a corresponding flow coefficient ($C_F$) from said storage means; and (d) multiplying said corresponding flow coefficient with said sensed velocity signal thereby to produce average velocity ($\overline{V}$).

12. The method as defined in claim 11, and further comprising the steps of:

(e) producing a pipe size signal ($P_S$) that is a function of the size of the conduit;

(f) multiplying said sensed depth signal ($D_S$) by said pipe size signal ($P_S$), thereby to produce an area signal ($A_S$); and (g) multiplying said area signal by said average velocity signal to produce a flow signal Q.

13. The method as defined in claim 12, and further including the step of:

(h) storing a plurality of sets of data including reference velocity ($V_R$), reference depth ($D_R$), pipe size ($P_S$), sensor type ($S_T$) and the ratio of average velocity to reference velocity corresponding with a different site condition, respectively.

14. The method as defined in claim 13, and further including the steps of:

(i) storing a plurality of reference depth to reference velocity ratios corresponding to different site conditions;

(j) dividing the site depth signal by the site velocity signal to produce a site ratio signal; and (k) comparing the site ratio signal with the stored reference ratio signals;

(l) producing a velocity coefficient ($C_F$) for the reference ratio that most nearly corresponds with the site ratio; and (m) multiplying the measured velocity signal by said produced velocity coefficient.

15. The method as defined in claim 12, and further including:

(h) generating a plurality of sets of reference depth ($D_R$) signals corresponding to a plurality of flow signals ($Q_S$) each of which is representative of flow for various flow rates at a specific site, respectively:

(i) storing said sets reference depth and flow signals in a signal comparison means;

(j) measuring site depth ($D_S$) at said specific site location; and (k) comparing said site depth with said stored depth to produce a corresponding flow signal.

* * * * *